(12) United States Patent
Chou et al.

(10) Patent No.: US 11,391,640 B2
(45) Date of Patent: Jul. 19, 2022

(54) CONNECTION ASSEMBLY FOR BODY AND CASING OF A PRESSURE GAUGE

(71) Applicants: Wen-San Chou, Tainan (TW); Cheng-Hsien Chou, Tainan (TW)

(72) Inventors: Wen-San Chou, Tainan (TW); Cheng-Hsien Chou, Tainan (TW)

( * ) Notice: Subject to any disclaimer, the term of this patent is extended or adjusted under 35 U.S.C. 154(b) by 259 days.

(21) Appl. No.: 16/726,650

(22) Filed: Dec. 24, 2019

(65) Prior Publication Data

US 2021/0190622 A1  Jun. 24, 2021

(51) Int. Cl.
*G01L 19/14* (2006.01)
*G01L 19/16* (2006.01)
(Continued)

(52) U.S. Cl.
CPC .............. *G01L 19/14* (2013.01); *G01D 11/26* (2013.01); *G01L 7/04* (2013.01); *G01L 19/0023* (2013.01); *G01L 19/16* (2013.01)

(58) Field of Classification Search
CPC . G01L 19/147; G01L 9/0072; G01L 19/0645; G01L 19/0084; G01L 13/025; G01L 19/0007; G01L 9/0042; G01L 19/0038; G01L 9/0073; G01L 9/0075; G01L 9/0054; G01L 9/0055; G01L 19/04; G01L 7/00; G01L 7/04; G01L 19/148; G01L 19/143; G01L 19/14; G01L 17/00; G01L 7/18; G01L 15/00; G01L 19/0092; G01L 9/0051; G01L 7/041; G01L 9/065; G01L 9/12; G01L 19/0618; G01L 9/0052; G01L 7/16; G01L 9/125; G01L 19/0609; G01L 9/007; G01L 19/003; G01L 19/0627; G01L 9/0022; G01L 19/0046; G01L 7/084; G01L 9/06; G01L 19/0636; G01L 13/02; G01L 19/0023; G01L 19/142; G01L 7/043; G01L 19/08; G01L 9/0002; G01L 9/008; G01L 19/02; G01L 19/141; G01L 9/006; G01L 11/02; G01L 23/18; G01L 23/10; G01L 19/0672; G01L 19/0681; G01L 9/0077; G01L 19/12; G01L 27/005; G01L 7/082; G01L 9/0044; G01L 19/0015; G01L 19/0069; G01L 7/063; G01L 9/0001; G01L 19/146; G01L 21/12; G01L 9/16; G01L 27/007; G01L 11/00; G01L 27/002; G01L 9/0026; G01L 19/00; G01L 9/0089; G01L 9/045; G01L 9/14; G01L 1/2281; G01L 11/025; G01L 11/008; G01L 19/0654;
(Continued)

(56) References Cited

U.S. PATENT DOCUMENTS

| 6,168,566 B1 * | 1/2001 | Lia ........................ G01L 7/082 600/488 |
| 2016/0258735 A1 * | 9/2016 | Chou ....................... G01B 5/18 |
| 2020/0408627 A1 * | 12/2020 | Chou ....................... G01L 7/022 |

FOREIGN PATENT DOCUMENTS

| CN | 107436206 A | * | 12/2017 | |
| DE | 102007013905 B4 | * | 1/2009 | ........... F16K 5/0407 |

(Continued)

*Primary Examiner* — Andre J Allen

(57) ABSTRACT

A pressure gauge contains: a body and a casing. The body includes a scale disc fixed on a top thereof. The casing is transparent and includes a close segment formed on a first end of the casing, an open segment formed on a second end of the casing, and multiple hooks spaced and arranged on an outer wall of the casing proximate to the opening segment.

6 Claims, 10 Drawing Sheets

(51) Int. Cl.
    *G01L 19/00*     (2006.01)
    *G01D 11/26*     (2006.01)
    *G01L 7/04*     (2006.01)

(58) Field of Classification Search
CPC ....... G01L 7/22; G01L 9/0047; G01L 13/026; G01L 9/0076; G01L 9/0025; G01L 9/0035; G01L 13/00; G01L 19/0061; G01L 9/0005; G01L 9/10; G01L 9/0019; G01L 9/08; G01L 11/006; G01L 21/00; G01L 7/08; G01L 9/0041; G01L 9/04; G01L 9/0008; G01L 11/004; G01L 19/083; G01L 19/086; G01L 9/0057; G01L 1/18; G01L 19/069; G01L 19/10; G01L 19/16; G01L 13/023; G01L 7/048; G01L 9/0016; G01L 9/0027; G01L 9/0086; G01L 9/0048; G01L 19/06; G01L 9/0079; G01L 11/04; G01L 9/00; G01L 9/0091; G01L 23/24; G01L 7/182; G01L 11/002; G01L 19/0663; G01L 27/00; G01L 7/166; G01L 1/20; G01L 23/22; G01L 9/0036; G01L 1/02; G01L 9/0061; G01L 9/0039; G01L 23/125; G01L 9/0013; G01L 9/0092; G01L 21/04; G01L 7/104; G01L 9/0045; G01L 19/145; G01L 9/0033; G01L 9/0083; G01L 9/0098; G01L 1/142; G01L 7/24; G01L 1/2293; G01L 9/0029; G01L 21/22; G01L 9/02; G01L 7/022; G01L 9/0064; G01L 23/08; G01L 23/16; G01L 5/14; G01L 7/088; G01L 7/163; G01L 9/0007; G01L 1/205; G01L 23/222; G01L 9/0085; G01L 1/16; G01L 1/2212; G01L 1/2287; G01L 13/06; G01L 9/0004; G01L 21/14; G01L 23/02; G01L 9/003; G01L 9/025; G01L 9/085; G01L 1/14; G01L 1/148; G01L 9/0058; G01L 9/105; G01L 7/061; G01L 9/002; G01L 7/02; G01L 1/2231; G01L 13/028; G01L 23/28; G01L 9/0095; G01L 1/162; G01L 7/12; G01L 9/0032; G01L 9/0038; G01L 19/0076; G01L 7/024; G01L 21/10; G01L 1/246; G01L 19/149; G01L 7/086; G01L 1/005; G01L 7/06; G01L 7/102; G01L 1/2206; G01L 13/021; G01L 27/02; G01L 5/228; G01L 1/2262; G01L 23/00; G01L 9/0094; G01L 1/24; G01L 9/0082; G01L 1/125; G01L 1/26; G01L 11/06; G01L 9/0097; G01L 1/2268; G01L 21/30; G01L 21/34; G01L 23/221; G01L 7/20; G01L 19/144; G01L 23/26; G01L 7/068; G01L 1/144; G01L 1/225; G01L 23/32; G01L 7/14; G01L 1/165; G01L 23/12; G01L 7/187; G01L 1/146; G01L 1/241; G01L 7/045; G01L 1/086; G01L 7/108; G01L 13/04; G01L 17/005; G01L 5/18; G01L 9/18; G01L 1/127; G01L 1/22; G01L 1/245; G01L 21/32; G01L 1/183; G01L 1/2218; G01L 9/0023; G01L 1/243; G01L 23/145; G01L 5/0047; G01L 9/0088; G01L 1/106; G01L 5/0076; G01L 1/10; G01L 1/186; G01L 23/223; G01L 25/00; G01L 5/165; G01L 9/001; G01L 9/0017; G01L 1/044; G01L 3/245; G01L 5/226; G01L 1/08; G01L 21/16; G01L 3/1485; G01L 5/0052; G01L 5/162; G01L 5/225; G01L 7/026; G01L 7/065; G01L 9/0014; G01L 1/242; G01L 21/24; G01L 3/10; G01L 5/0004; G01L 9/005; G01L 1/00; G01L 1/04; G01L 1/103; G01L 1/2275; G01L 1/247; G01L 21/02; G01L 21/26; G01L 23/225; G01L 3/102; G01L 3/105; G01L 5/0038; G01L 5/223; G01L 5/24; G01L 7/028; G01L 7/10; G01L 9/0011; G01L 5/243; G01L 1/083; G01L 1/12; G01L 21/36; G01L 23/04; G01L 23/14; G01L 23/30; G01L 3/103; G01L 5/00; G01L 5/0028; G01L 5/102; G01L 5/133; G01L 5/166; G01L 7/185; G01L 1/255; G01L 21/08; G01L 5/0033; G01L 5/0057; G01L 5/161; G01L 1/042; G01L 1/122; G01L 1/2225; G01L 1/2243; G01L 1/2256; G01L 1/248; G01L 2009/0066; G01L 2009/0067; G01L 2009/0069; G01L 21/06; G01L 23/06; G01L 3/00; G01L 3/06; G01L 3/1478; G01L 3/1492; G01L 3/18; G01L 3/24; G01L 3/242; G01L 5/08; G01L 5/10; G01L 5/101; G01L 5/108; G01L 5/16; G01L 5/1627; G01L 5/167; G01L 5/22; G01L 5/28; G01L 23/085; G01L 23/20; G01L 5/0061; G01L 5/0071; G01L 5/008; G01L 5/06; G01L 5/171; G01L 7/106
USPC .................................................. 73/700–756
See application file for complete search history.

(56) References Cited

FOREIGN PATENT DOCUMENTS

| | | | | |
|---|---|---|---|---|
| DE | 102018215811 A1 | * | 3/2019 | ........... G01L 19/143 |
| DE | 102019124472 A1 | * | 3/2021 | ........... G01D 11/245 |
| WO | WO-2015135910 A1 | * | 9/2015 | ........... G01L 19/144 |

* cited by examiner

CONNECTION ASSEMBLY FOR BODY AND CASING OF A PRESSURE GAUGE

FIELD OF THE INVENTION

The present invention relates to a pressure gauge which avoids a split of the outer wall of the casing after connecting the body with the casing.

BACKGROUND OF THE INVENTION

Referring to FIGS. 8-10, a conventional pressure gauge 3 contains a cover 4, a casing 5 and a body 6.

The cover 4 and the casing 5 are made of acrylic or AS material. When the cover 4, the casing 5 and the body are connected tightly, the cover 4 and the casing 5 are broken easily.

The present invention has arisen to mitigate and/or obviate the afore-described disadvantages.

SUMMARY OF THE INVENTION

The primary aspect of the present invention is to provide a pressure gauge which avoids a split of the outer wall of the casing after connecting the body with the casing.

To obtain above-mentioned aspect, a pressure gauge provided by the present invention contains: a body and a casing.

The body includes a scale disc fixed on a top thereof.

The casing is transparent and includes a close segment formed on a first end of the casing, an open segment formed on a second end of the casing, and multiple hooks spaced and arranged on an outer wall of the casing proximate to the opening segment.

DETAILED DESCRIPTION OF THE PREFERRED EMBODIMENTS

Figure 1:
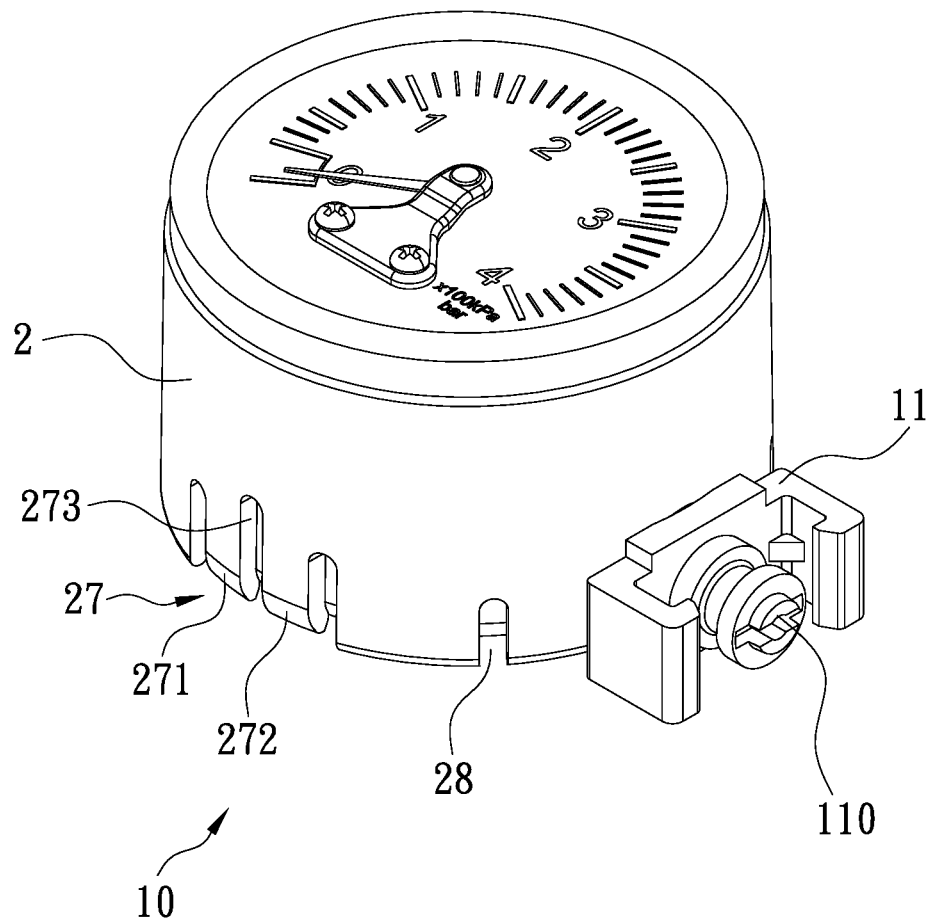
FIG. 1 is a perspective view showing the assembly of a pressure gauge according to a first embodiment of the present invention.
Figure 2:
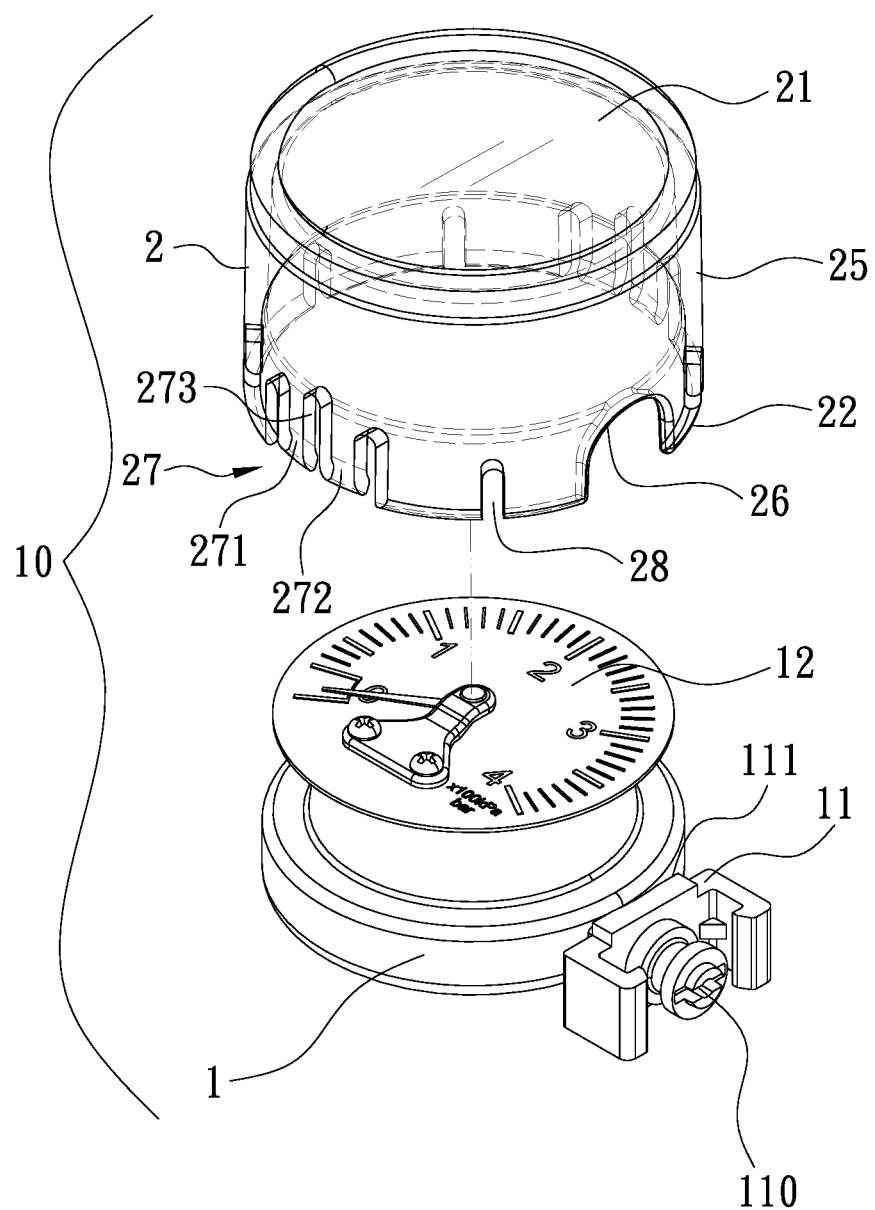
FIG. 2 is a perspective view showing the exploded components of the pressure gauge according to the first embodiment of the present invention.
Figure 3:
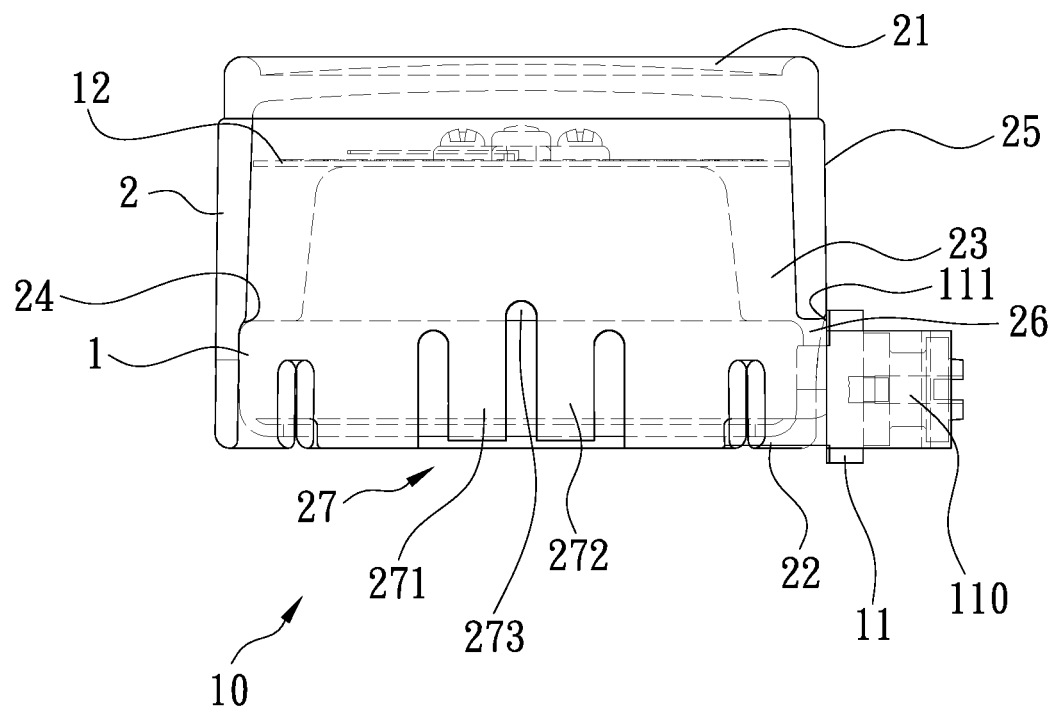
FIG. 3 is a side plan view showing the assembly of the pressure gauge according to the first embodiment of the present invention.

With reference to FIGS. 1 and 2, a pressure gauge 10 according to a first embodiment of the present invention comprises: a body 1 and a casing 2 covered on the base 1.

The body 1 includes a connector 11 arranged on a peripheral side thereof and having an inlet pipe 110 configured to receive pressure air, and the body 1 further includes a scale disc 12 fixed on a top thereof so as to display a pressure value after receiving the pressure air.

Figure 5:
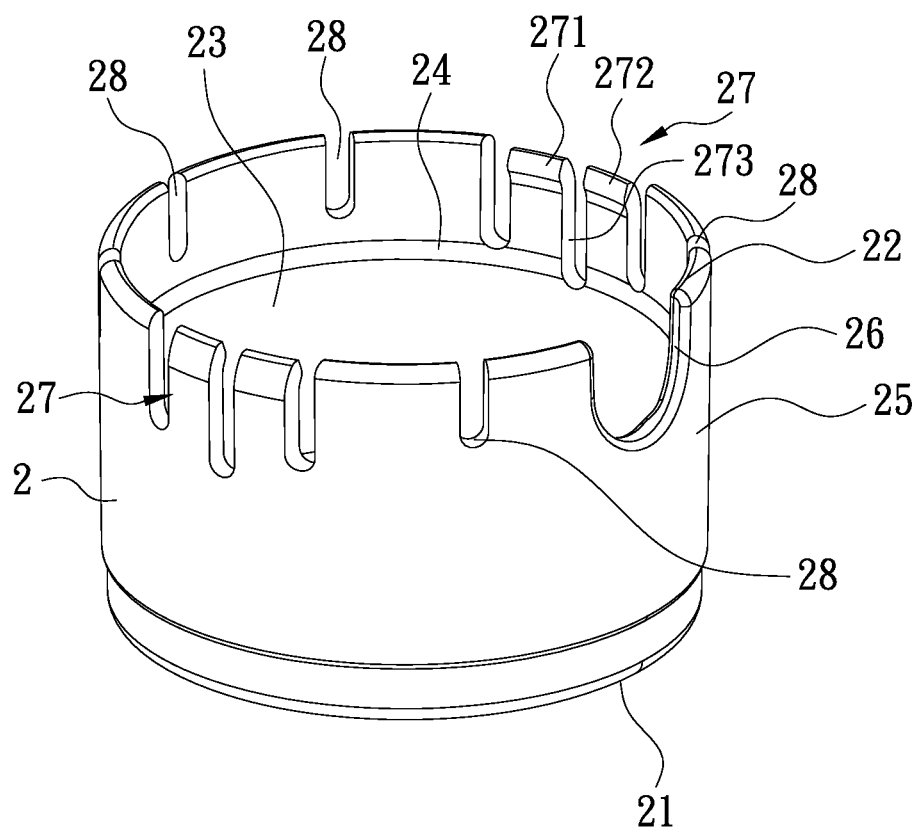
FIG. 5 is a perspective view showing the assembly of a casing of the pressure gauge according to the first embodiment of the present invention.
Figure 6:
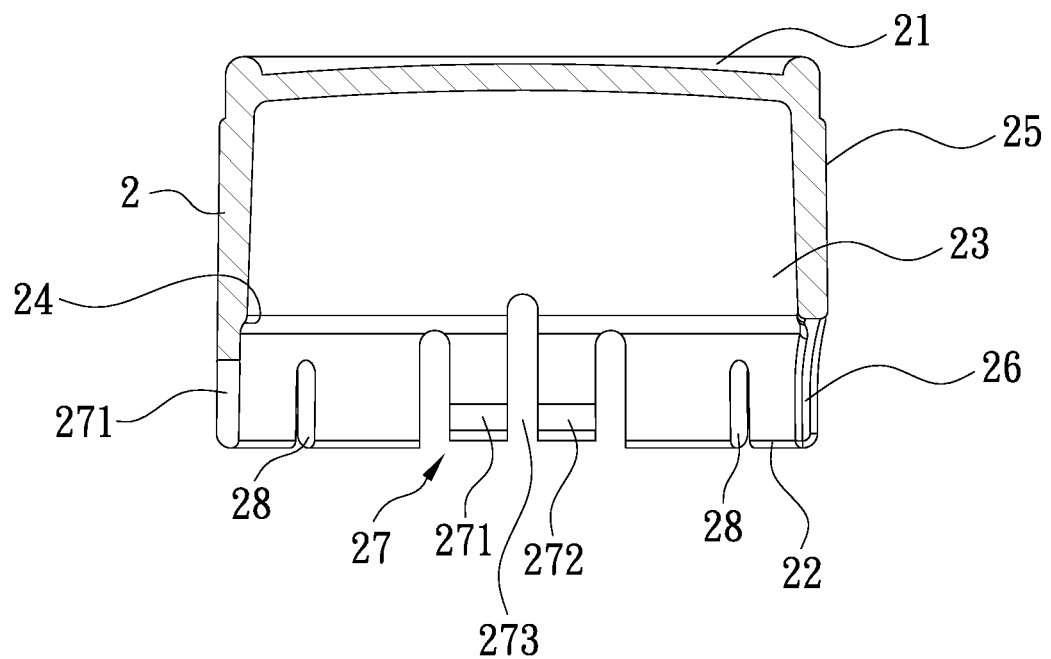
FIG. 6 is a cross sectional view showing the assembly of the casing of the pressure gauge according to the first embodiment of the present invention.

Referring to FIGS. 5 and 6, the casing 2 is transparent and includes a close segment 21 formed on a first end of the casing 2, an open segment 22 formed on a second end of the casing 2, an abutting rib 24 surrounding an inner wall 23 of the casing 2, and a cutout 26, multiple hooks 271, 272, multiple first slits 273, and multiple second slits 28 are spaced and arranged on the outer wall 25 of the casing 2 proximate to the open segment 22.

As shown in FIG. 5, any two adjacent of the multiple hooks 271, 272 are formed a hooking assembly 27, and each of the multiple first slits 273 is defined between any two adjacent hooks 271, 272. In this embodiment, two hooking assemblies 27 are separately formed on the outer wall 25 of the casing 2, and the multiple second slits 28 are spaced and arranged between the two hooking assemblies 27.

Figure 4:
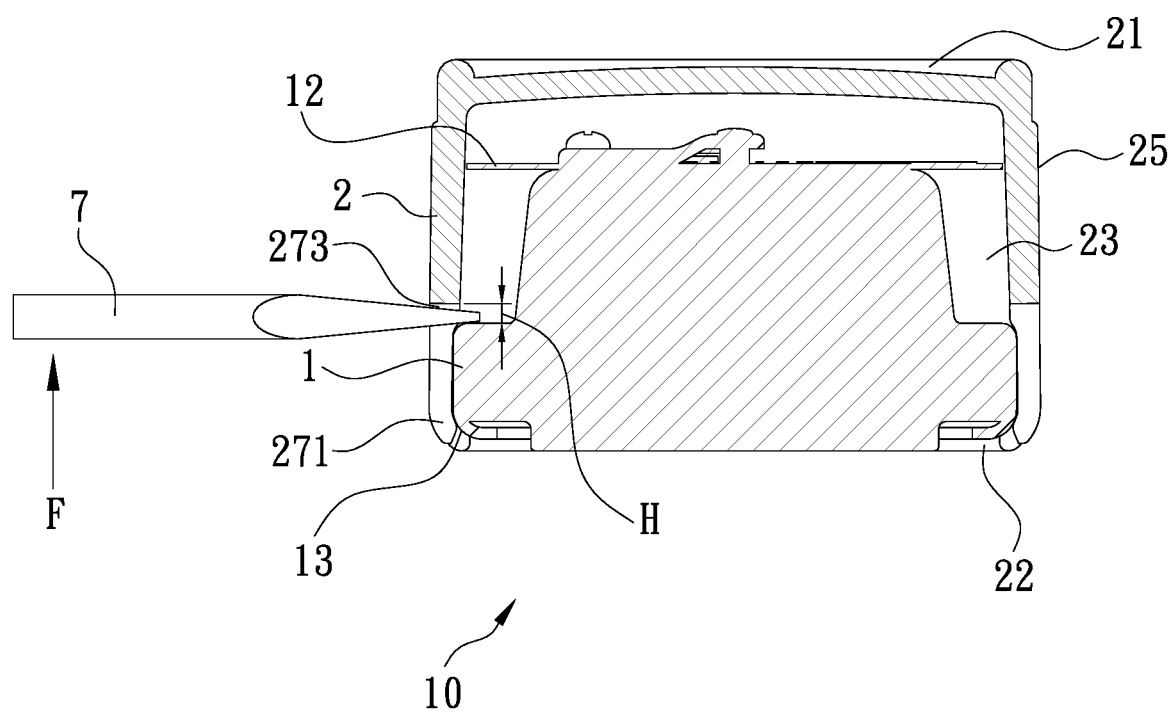
FIG. 4 is a cross sectional view showing the assembly of the pressure gauge according to the first embodiment of the present invention.

As illustrated in FIGS. 1-4, the casing 2 is covered on the body 1 from the open segment 22, wherein the cutout 26 of the casing 2 is retained with a back face 111 of the connector 11, the body 1 abuts against the abutting rib 24 of the casing 2, and the multiple hooks 271, 272 of the casing 2 hook an outer rim 13 of the body 1, wherein the multiple second slits 28 of the outer wall 25 of the casing 2 scatter a squeeze force of the casing 2 forced by the body 1 so as to avoid a split of the outer wall 25 of the casing 2. A height H produces between the body 1 and a bottom of each first slit 273 of the casing 2, wherein the height H is more than zero. When one of any two adjacent hooks 271, 272 is broken, the other hook 271 or 272 hooks the outer rim 13 of the body 1, hence the casing 2 is connected with the body 1. When the casing 2 is removed from the body 1, a removal tool 7 is inserted into each first slit 273 and exerts a force F to remove the casing 2 from the body 1, as shown in FIG. 4.

Figure 7:
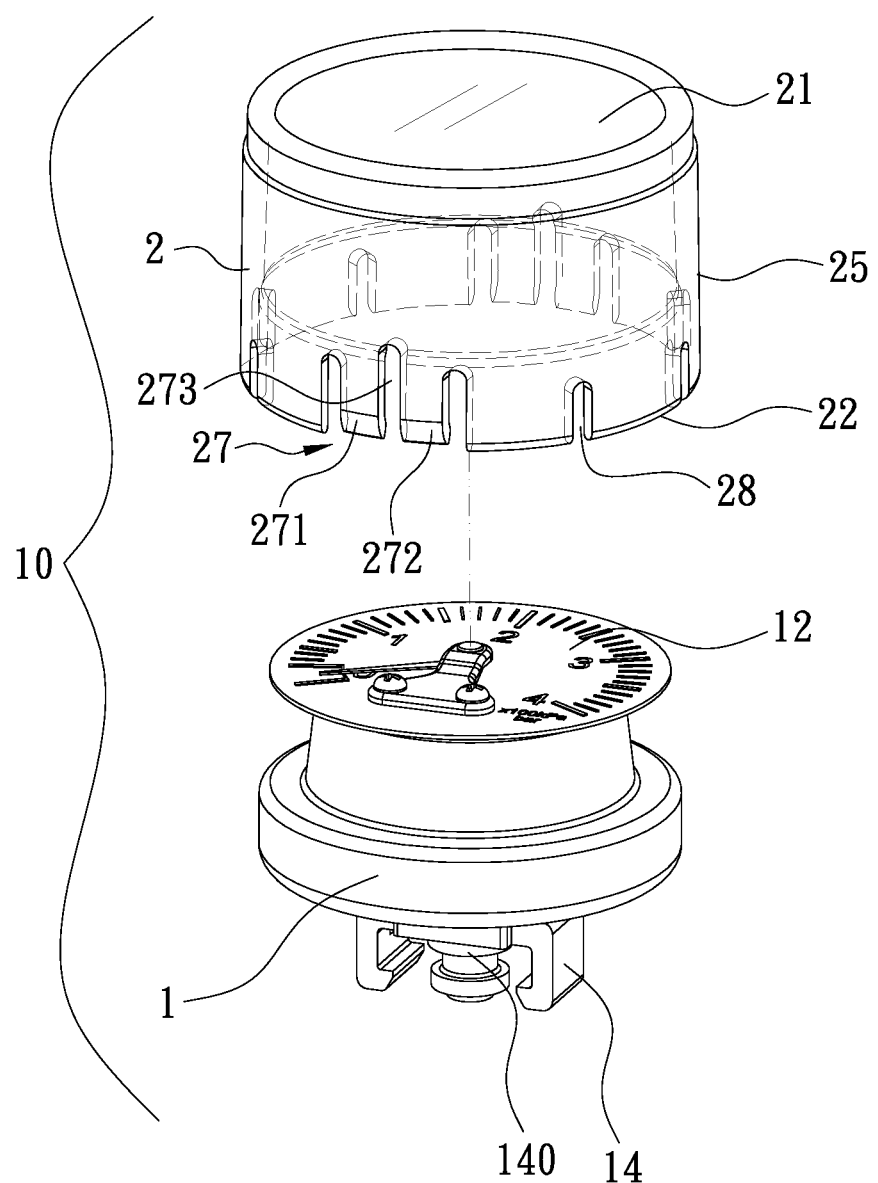
FIG. 7 is a perspective view showing the exploded components of a pressure gauge according to a second embodiment of the present invention.
Figure 8:
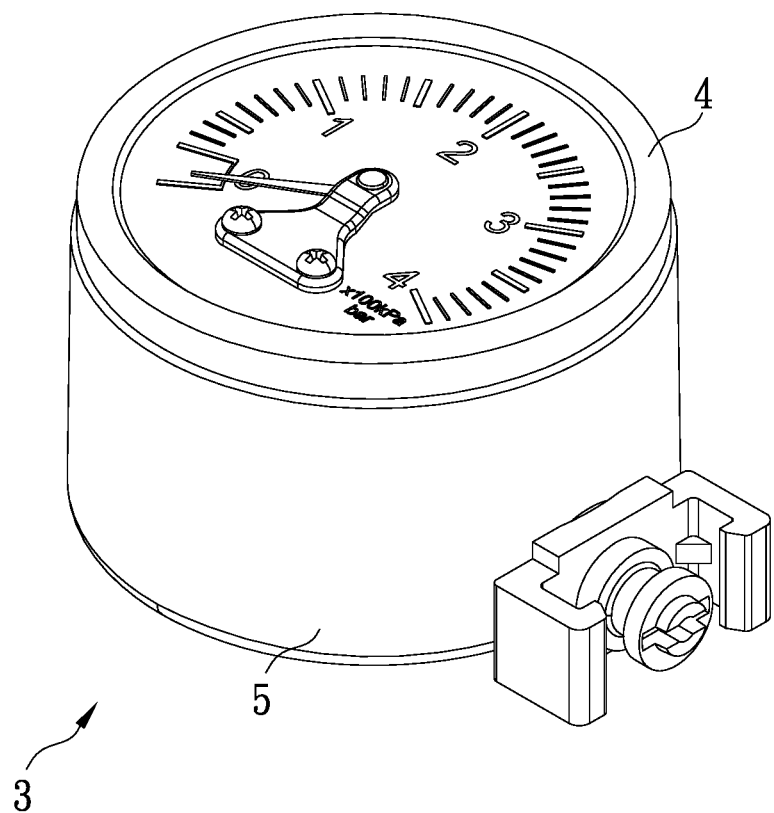
FIG. 8 is a perspective view showing the assembly of a conventional pressure gauge.
Figure 9:
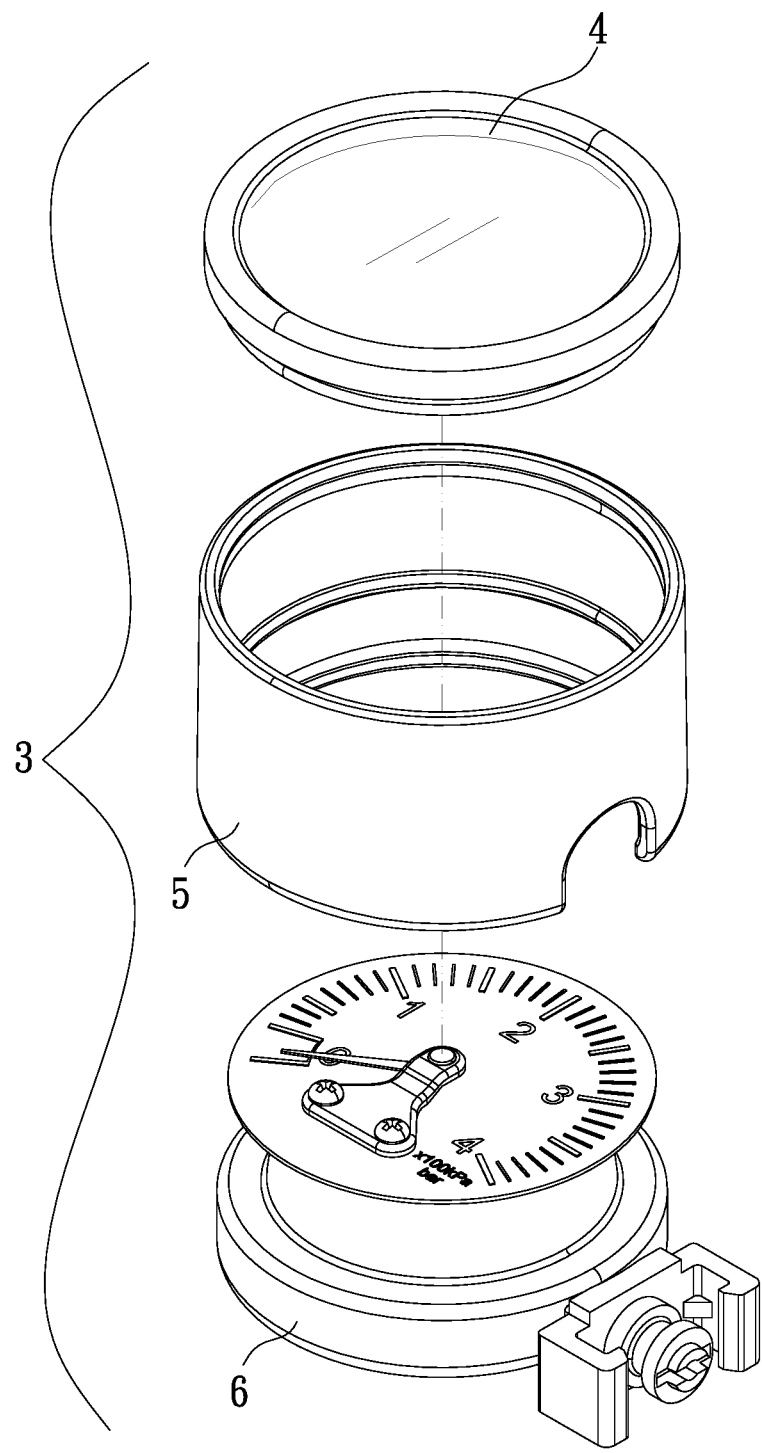
FIG. 9 is a perspective view showing the exploded components of the conventional pressure gauge.
Figure 10:
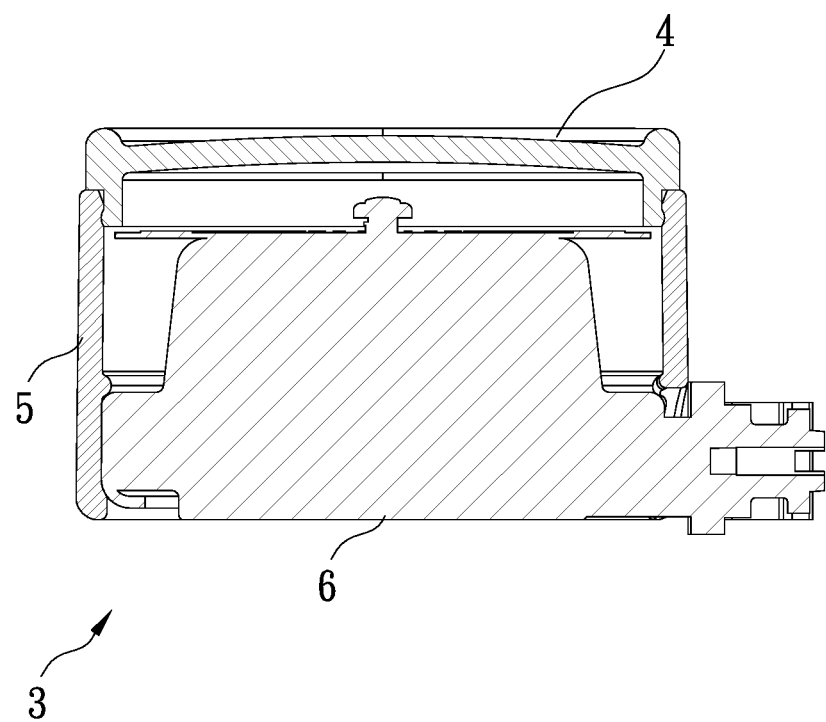
FIG. 10 is a cross sectional view showing the assembly of the conventional pressure gauge.

With reference to FIG. 7, in a second embodiment, an inlet pipe 140 is arranged on a bottom of the body 1 and is configured to receive pressure air.

Thereby, the pressure gauge 10 comprises the body 1 and the casing 2 covered on the body 1, wherein the casing 2 is covered on the body 1 from the open segment 22, the body 1 abuts against the abutting rib 24 of the inner wall 23 of the casing 2, and the multiple hooks 271, 272 of the casing 2 hook the outer rim 13 of the body 1, wherein the multiple second slits 28 of the outer wall 25 of the casing 2 scatter the squeeze force of the casing 2 forced by the body 1 so as to avoid the split of the outer wall 25 of the casing 2.

While the preferred embodiments of the invention have been set forth for the purpose of disclosure, modifications of the disclosed embodiments of the invention and other embodiments thereof may occur to those skilled in the art. Accordingly, the appended claims are intended to cover all embodiments which do not depart from the spirit and scope of the invention.

What is claimed is:

1. A pressure gauge comprising:
   a body including a scale disc fixed on a top of the body;
   a casing being transparent and including a closed segment formed on a first end of the casing, an open segment formed on a second end of the casing, and multiple hooks spaced and arranged on an outer wall of the casing proximate to the open segment;
   wherein any two adjacent of the multiple hooks form a hooking assembly, and each of multiple first slits is defined between any two adjacent hooks.

2. The pressure gauge as claimed in claim 1, wherein the body includes a connector arranged on a peripheral side thereof, and the connector has an inlet pipe configured to receive pressurized air, wherein the casing further includes a cutout arranged on the outer wall of the casing proximate to the open segment.

3. The pressure gauge as claimed in claim 1, wherein the casing includes an abutting rib surrounding an inner wall of the casing.

4. The pressure gauge as claimed in claim 1, wherein two hooking assemblies are separately formed on the outer wall of the casing, and multiple second slits are spaced and arranged between the two hooking assemblies.

5. The pressure gauge as claimed in claim 1, wherein a height is defined between the body and a bottom of each first slit of the casing, and the height is more than zero.

6. The pressure gauge as claimed in claim 1, wherein an inlet pipe is arranged on a bottom of the body and is configured to receive pressurized air.

\* \* \* \* \*